Figure 1:
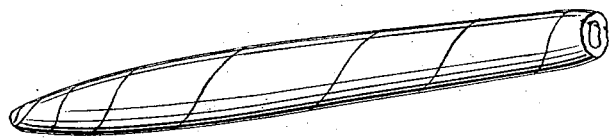
Figure 2:
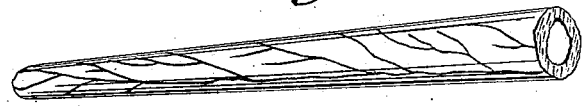
Figure 3:

W. P. SURGEY.
Cigar.

No. 16,200.  Patented Dec. 9, 1856.

UNITED STATES PATENT OFFICE.

WILLIAM PALMER SURGEY, OF HACKNEY, COUNTY OF MIDDLESEX, ENGLAND, ASSIGNOR TO CHARLES HENRY STANLEY, OF NEW YORK, N. Y.

IMPROVEMENT IN CIGARS.

Specification forming part of Letters Patent No. 16,200, dated December 9, 1856.

*To all whom it may concern:*

Be it known that I, WILLIAM PALMER SURGEY, of Hackney, in the county of Middlesex and Kingdom of Great Britain, have invented new and useful Improvements in Cigars, Cigarettes, and Cheroots; and I do hereby declare that the following is a full and exact description of the same, reference being had to the accompanying sheet of drawings.

The improvements consist in affixing or applying to the lighting end of each cigar, cigarette, or cheroot a portion of matter, mixture, or composition capable of being ignited by friction or other pressure, and in such manner that the matter, mixture, or composition will for the time form a component part of the cigar, cigarette, or cheroot, whereby the same may be lighted without the necessity for the application of other separate lighting means.

I do not confine myself to any particular matter, mixture, or composition, but use any matter, mixture, or composition suitable to be employed in the production of fusees, vestas, or other instantaneous lights or igniters, and the matter, mixture, or composition employed I apply to the end of the cigar, cigarette, or cheroot, when dry and hard, by gum or other suitable adhesive, which I prefer to be thickened by nitrate of potash or saltpeter; or the matter, composition, or mixture may be applied (by dipping or otherwise) to the ends of the cigars, cigarettes, or cheroots when such matter, composition, or mixture is in a semifluid or pasty state; but this may be varied. But that the nature of the invention may be fully understood and readily carried into effect I will proceed to describe the means pursued by me.

I first prepare the ends to be lighted of the cigars, cigarettes, or cheroots by dipping such ends in a solution of gum or glue or other suitable adhesive, by which the adhesion of the ignitible matter to the ends of the cigars, cigarettes, or cheroots will be better secured. I find also that the application of such matters has a tendency to prevent the ignitible mixture from having any unpleasant effect upon the cigar, cigarette, or cheroot, as also to strengthen that part of the cigar, cigarette, or cheroot and prevent its opening by the friction applied. I thicken the adhesive with a small quantity of nitrate of potash, (saltpeter,) which I prefer to be previously heated in order to liberate the water combined with it, and in some cases also I have added a small quantity of finely-powdered charcoal, and when desired to give flavor to the mixture I have also added a small quantity of cascarilla-bark or other flavoring matter.

Having prepared the ends of the cigars, cigarettes, or cheroots by the application thereto of such or other suitable combustible adheside, I allow them to get well dry, and then I apply the ignitible composition either in a dry or semi-fluid or pasty state; and I would here repeat that I do not confine myself to any particular composition, but use any such as are employed when preparing splints, as "lucifers," or "fusees," or "vestas," or other instantaneous lights; but one which I have found to answer the purpose well consists of glue, three pounds; phosphorus, twenty-four ounces, melted and mixed together, and to which I add, in powder well mixed together, nitrate of potash, eight ounces; resin, six ounces; Venetian red or other coloring-matter, to give color to the composition, one and one-fourth pound; glass, one-half pound; whiting, one and one-half pound. When the ignitible composition is to be applied in the dry state, I again moisten the end of the cigar, cigarette, or cheroot by the application of a small quantity of such adhesive matter sufficient to retain the ignitible composition. When the ignitible composition is to be applied in a semi-fluid or pasty state, I having first prepared the ends of the cigars, cigarettes, or cheroots as above stated, I simply dip those ends in the composition so as to take up the desired quantity, or apply the same by means of a piece of wood or other suitable instrument. In any case I only apply such quantity of the ignitible composition as will, when dry, be sufficient, upon the application of friction, as when lighting lucifers, fuses, vestas, or other instantaneous lights, to produce the desired ignition to the cigars, cigarettes, or cheroots.

Having thus described the nature of my said invention and the means I pursue in carrying the same into effect, I would have it understood that I am aware splints of wood or other matter with combustible and ignitible composition applied thereto have been inserted into the ends of cigars, and then by the application of friction to such combustible composition the cigars have been ignited; but such combustible compositions were formed separately, and were capable of being ignited separately for the purpose of lighting, and to the best of my belief such application has been found objectionable from the trouble occasioned in effecting the insertion of the wood or other matter to which the combustible composition was applied, and by the injury to the cigar by breaking the end of it in effecting such insertion. I do not therefore claim for the application of such composition to the ends of cigars, cigarettes, or cheroots in the form of separate instruments to be applied when formed into igniters, as my invention consists in applying the composition so as to form the igniter onto and as a part of the cigar, cigarette, or cheroot, whereby such ignitible matter, mixture, or composition becomes a component part of such cigars, cigarettes, or cheroots to be ignited by the simple application of friction, as when lighting fusees, vestas, lucifer matches, and other instantaneous lights, as expressed; and

I claim—

Cigars, cheroots, and cigarettes, so made as a new and useful article of manufacture.

In witness whereof I, the said WILLIAM PALMER SURGEY, have hereunto set my hand this 3d day of October, in the year of our Lord 1856.

WILLIAM PALMER SURGEY.

Witnesses:
   T. BRIGGS SMITH,
   JOHN T. PITMAN,
      67 *Gracechurch Street.*